April 7, 1959 L. E. ALBERTSON 2,880,872
WATER SOFTENING SYSTEM AND APPARATUS
Filed March 10, 1955 6 Sheets-Sheet 1

INVENTOR.
LAWRENCE E. ALBERTSON
BY
Braddock and Braddock
ATTORNEYS

April 7, 1959 L. E. ALBERTSON 2,880,872
WATER SOFTENING SYSTEM AND APPARATUS
Filed March 10, 1955 6 Sheets-Sheet 2
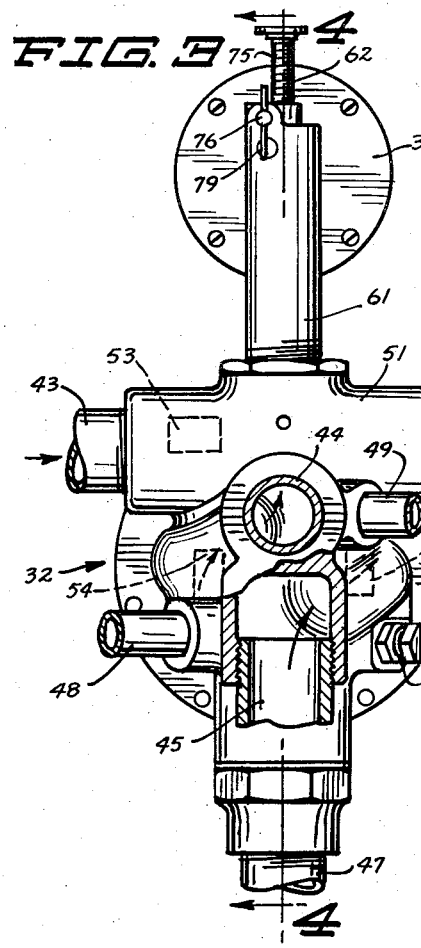
INVENTOR.
LAWRENCE E. ALBERTSON
BY
Braddock and Braddock
ATTORNEYS

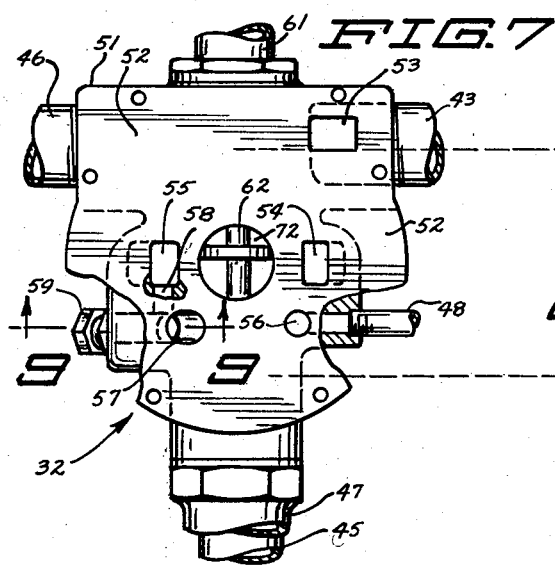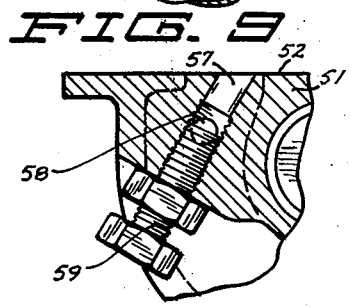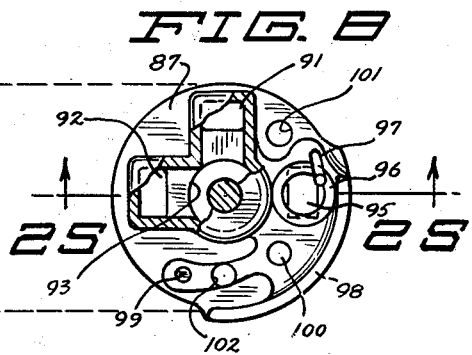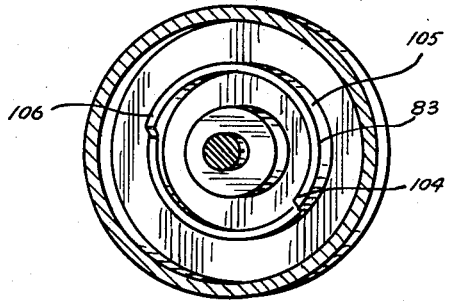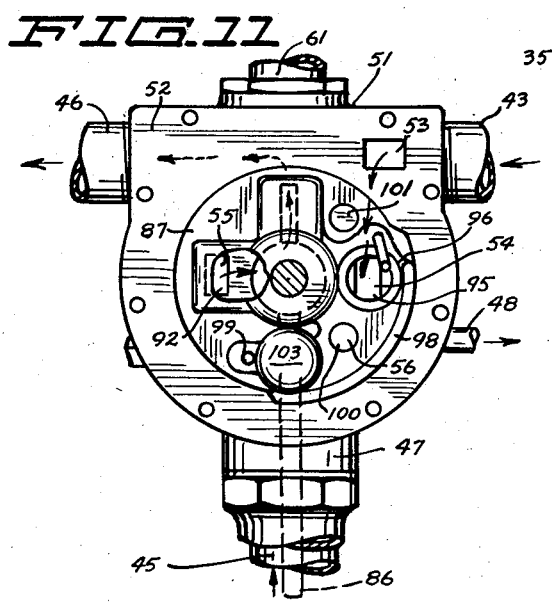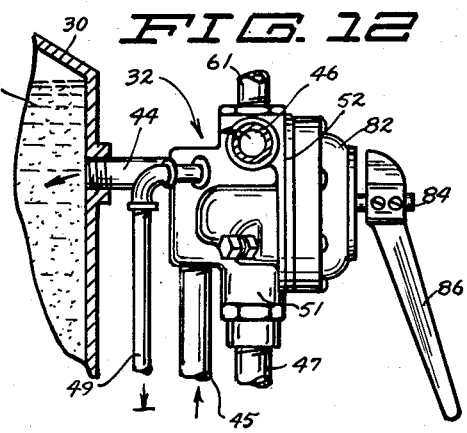

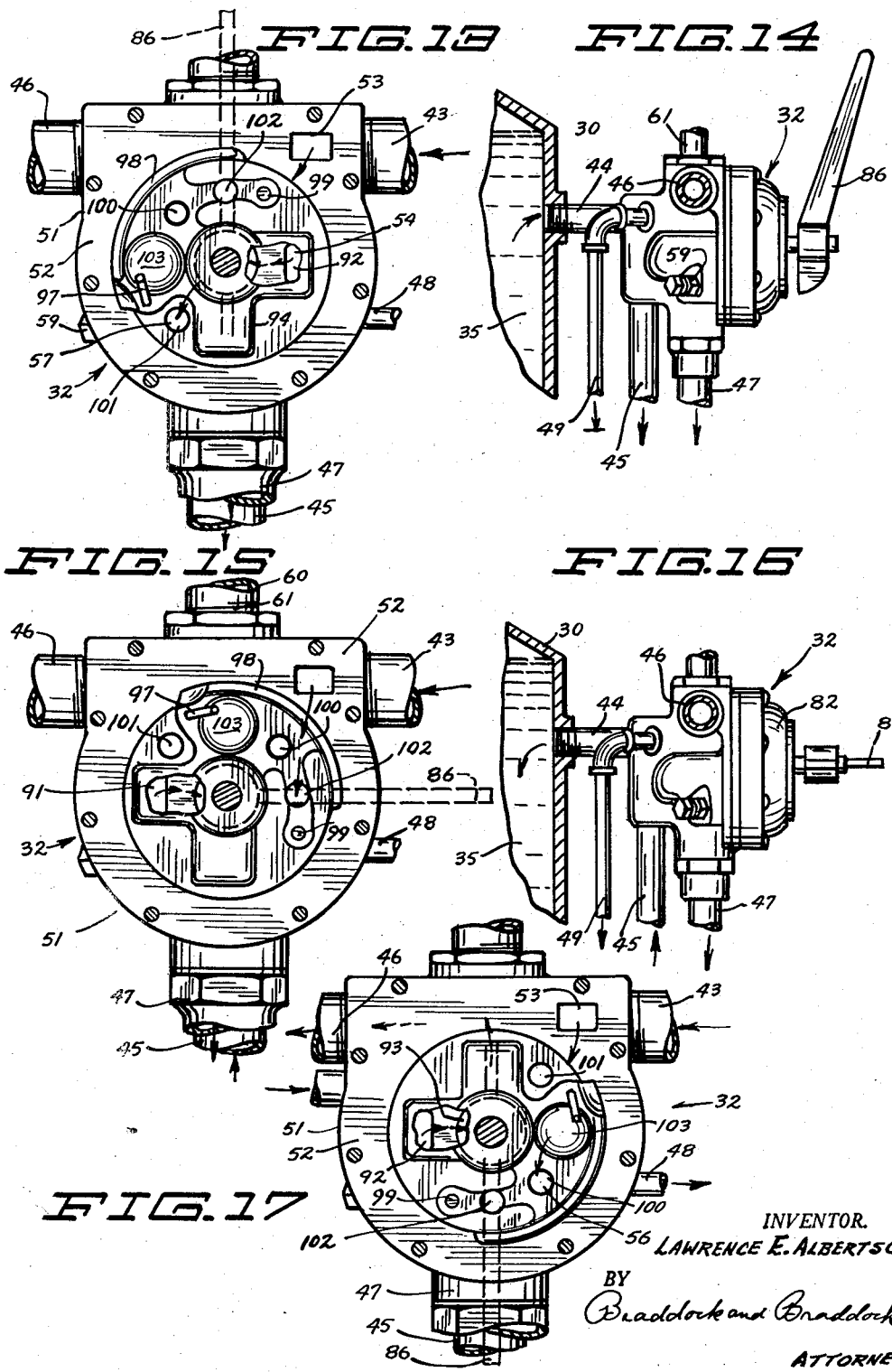

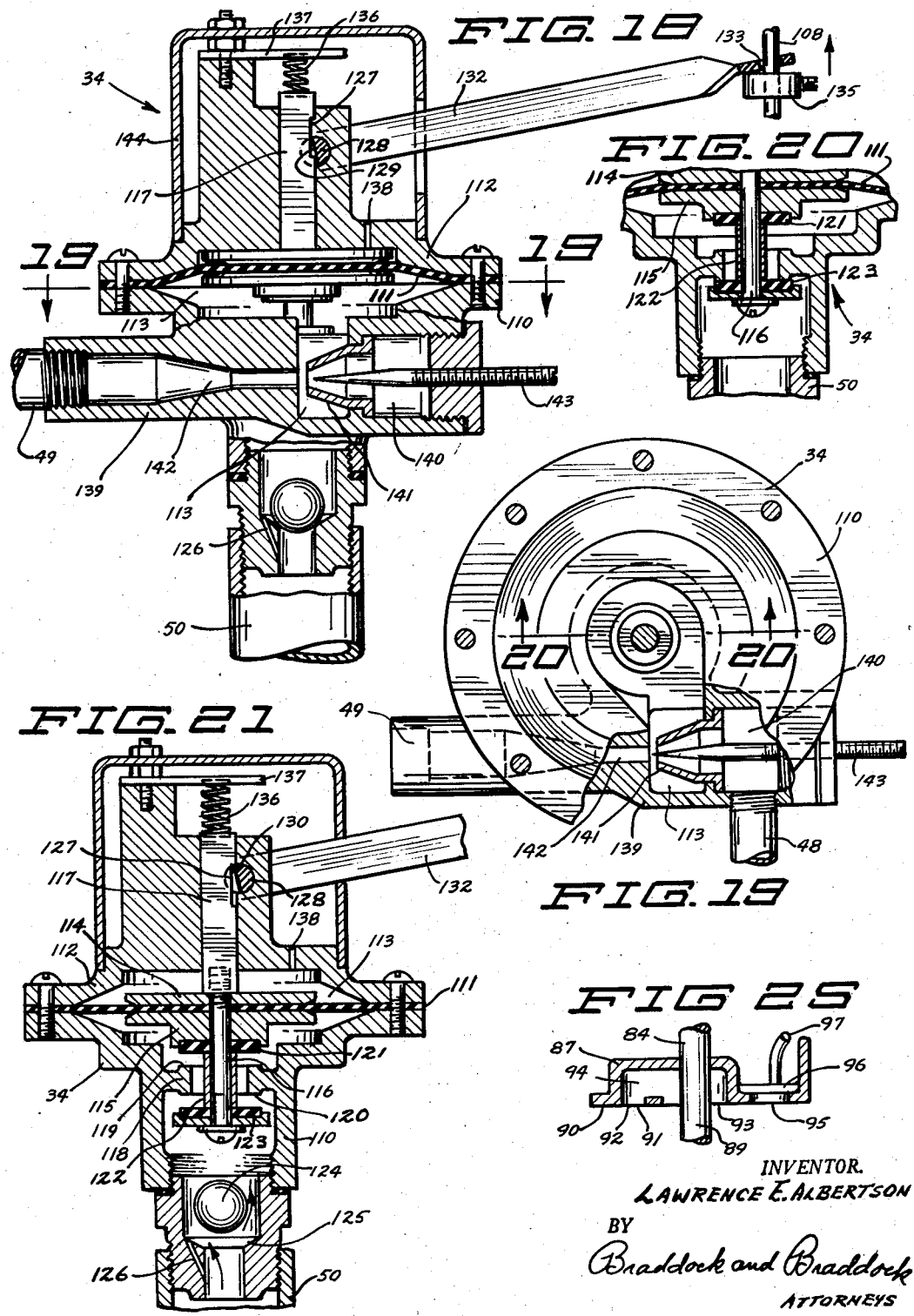

April 7, 1959     L. E. ALBERTSON     2,880,872
WATER SOFTENING SYSTEM AND APPARATUS
Filed March 10, 1955     6 Sheets-Sheet 6

INVENTOR.
LAWRENCE E. ALBERTSON
BY
Braddock and Braddock
ATTORNEYS

United States Patent Office 2,880,872
Patented Apr. 7, 1959

2,880,872

WATER SOFTENING SYSTEM AND APPARATUS

Lawrence Edward Albertson, Minneapolis, Minn., assignor to The McKays Company, St. Paul, Minn., a corporation of Delaware Application March 10, 1955, Serial No. 493,445

1 Claim. (Cl. 210—104)

This is a continuation-in-part of my application Serial No. 409,304, filed February 10, 1954, now Patent No. 2,820,419, issued January 21, 1958.

This invention has relation to a water softening system and apparatus which is adapted to perform automatically and semi-automatically during the regeneration thereof.

In a water softener employing a bed of base exchange softening minerals such as zeolite, to extract from raw water the undesirable constituents thereof; a point is reached after an extended period of normal softening service when said bed must be regenerated. This regeneration is accomplished by introducing brine into the bed. After this brine has had the desired effect on the zeolite bed or other base exchange mineral, it is necessary that all traces of the brine be rinsed out before normal softening operation is resumed. To automatically accomplish this regenerating operation, a brine tank, a softener control valve, a timer, a regeneration control valve and appropriate pipes are employed in conjunction with the water softener tank containing the zeolite bed.

To institute the regenerating operation, the softener control valve is positioned to cause water from a raw water inlet to pass to the regeneration control valve. A venturi action inside of said regeneration control valve due to the flow of raw water therein causes brine in the brine tank to be introduced into the stream of raw water. This mixture of raw water and brine is directed back into the softening control valve from whence it emerges to enter the top of the softener tank. The mixture passes down through the tank and, as it does so, regenerates the zeolite bed. Flow from the bottom of the tank is through the softener control valve to drain. When a predetermined amount of the brine has left the brine tank, the regeneration valve will automatically operate to cut off the flow of said brine to the raw water stream but the raw water will continue to flow through the regeneration valve, the softener control valve and into the top of the zeolite bed of the softener tank. This flow will be continued for a predetermined period of time to allow the raw water to rinse all traces of the brine solution from the bed, out the bottom of the softener tank and through the softener control valve to drain. At the end of this predetermined time, the timer will operate on the softener control valve and said valve will operate to shift the access of the bottom of the softener tank from drain to the normal soft water outlet pipe of the system, and to open the top of the softening tank directly to the raw water inlet. The raw water inlet will now have connection to the regenerating valve along both pipes from the softener control valve and the regeneration valve will operate to permit raw water to flow back into the brine tank until it reaches a predetermined level, therein. When this level is reached, the regeneration valve will cut off entry of raw water to said brine tank.

As has been indicated above, once the softener control valve and timer have been put into the position to commence the regenerating operation, the entire action is completely automatic until and including the time that normal softening service is again restored and the brine tank has been replenished.

After the softener has been in service long enough to have been regenerated as explained above for a number of times, it becomes desirable to cause raw water to move through the zeolite bed at a reduced rate in reverse of normal softening direction to pass to drain. This will allow any sludge or other sedimentary materials which may have been trapped in the bed due to the filtering action thereof to be cleared from the system. This is known as the backwashing operation. The construction of the system and apparatus is such that the softener control valve can be positioned to permit the passage of raw water from the raw water inlet through a restricted opening in said valve, to the bottom of the softening tank where it will backwash up through the zeolite bed and out through the softener control valve to drain.

It is also desirable to cause a maximum flow of water to pass in the usual softening direction to drain. This is called the downwashing operation and is usually performed after the backwashing operation and before the regenerating operation. The softener control valve can be set to both open the raw water inlet to the top of the tank and open the bottom of the tank to drain to downwash the bed.

Following these operations, the timer and softener control valve can be positioned as explained for the regenerating operation and the remainder of the cycle will be entirely automatic.

Fig. 3 is a rear elevational view partially in section and partially broken away, of a timer and softener control valve of the invention;

Fig. 4 is a vertical sectional view taken on line 4—4 in Fig. 3;

Fig. 5 is a horizontal sectional view taken on line 5—5 in Fig. 4;

Fig. 6 is an enlarged vertical sectional view taken on line 6—6 in Fig. 4;

Fig. 7 is a vertical sectional view taken on line 7—7 in Fig. 4;

Fig. 8 is an elevational view, partially in section and partially broken away, of a rotatable disc valve as it would appear had it been included in the showing of Fig. 7;

Fig. 9 is an enlarged horizontal sectional view taken on line 9—9 in Fig. 7;

Fig. 10 is a vertical sectional view of a portion of a softener control valve cap taken on line 10—10 in Fig. 4 but shown in perspective to best reveal the shape of certain parts thereof;

Fig. 11 is an elevational view of the parts as seen in Fig. 7 with the rotatable disc valve of Fig. 8 in position thereon, the parts being positioned as for normal softening operation;

Fig. 12 is a view corresponding generally with the disclosure of Fig. 2 but showing the flow pattern which obtains when the apparatus is in normal softening operation;

Fig. 13 is a view corresponding generally with the disclosure of Fig. 11 but with the parts positioned as for backwashing operation;

Fig. 14 is a view corresponding generally with the disclosure of Fig. 2 but with the parts positioned as for backwashing operation;

Fig. 15 is a view corresponding generally with the disclosure of Fig. 11 but with the parts positioned as for the downwashing operation;

Fig. 16 is a view corresponding generally with the disclosure of Fig. 2 but with the parts positioned as for downwashing operation;

Fig. 17 is a view corresponding generally with the disclosure of Fig. 11 but with the parts positioned as for the regenerating operation;

Fig. 18 is a vertical sectional view of a regeneration control valve of the invention showing the parts positioned as for normal softening operation;

Fig. 19 is a horizontal sectional view taken on line 19—19 in Fig. 18;

Fig. 20 is a vertical sectional view on line 20—20 in Fig. 19;

Fig. 21 is a view corresponding generally with the disclosure of Fig. 18, but showing the parts positioned as for the brining portion of the regeneration operation;

Fig. 25 is a detail sectional view taken on the line 25—25 in Fig. 8.

Figure 1:
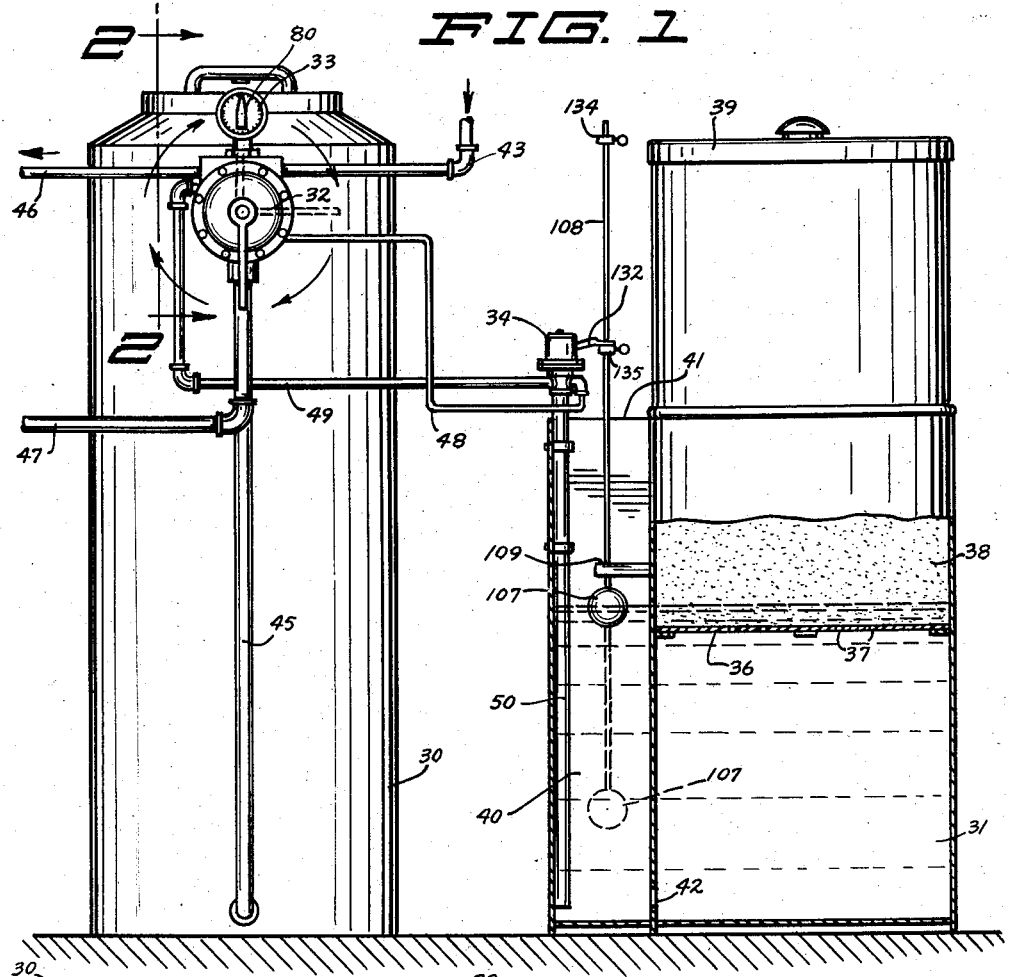
Fig. 1 is an elevational view, partially in section and partially broken away, of a water softening system and apparatus made according to the present invention.

Referring to the drawings and the numerals thereof, a water softening system and apparatus of the invention includes a water softener tank 30, a brine tank 31, a softening control valve 32, a timer 33 and a regeneration control valve 34. The interior of the water softener tank 30 contains a zeolite bed 35. A removable screen or grid 36 is supported in the brine tank 31 at an intermediate portion thereof and has holes 37 extending therethrough. A quantity of salt 38 is supported on the grid 36. A cover 39 protects the salt in the brine tank 31. A float tank 40 is integral with and extends outwardly from a lower portion of the brine tank 31. A top open end 41 of the float tank 40 extends to position substantially above the location of the grid 36 and a hole 42 in a lower portion of the wall of the brine tank forms an opening between the brine and float tanks.

A raw water inlet pipe 43 leads from a source (not shown) of water supply under pressure to the softening control valve 32, a top softener tank pipe 44 leads from the softening control valve 32 to the top of the zeolite bed 35 in the water softener tank 30, while a bottom softener tank pipe 45 leads from the bottom of the zeolite bed in the water softening tank to the softening control valve, and a soft water outlet pipe 46 leads from the softening control valve to locations for use (not shown). A drain pipe 47 leads from the softening control valve 32 to drain.

A regenerating raw water supply pipe 48 leads from the softening control valve 32 to regeneration control valve 34 while a regenerating delivery pipe 49 leads from said regeneration control valve to said softening control valve. A brine pipe 50 extends from the regeneration control valve 34 to location near the bottom of float tank 40.

A main casting 51 of the softening control valve 32 is provided with a smooth, flat surface 52. The raw water inlet pipe 43 is open to a raw water inlet port 53 at said flat surface 52, while the top softener tank pipe 44 is open to a top softener tank port 54 and bottom softener tank pipe 45 is open to a bottom softening tank port 55 at the flat surface 52. Regenerating raw water supply pipe 48 is open through the main casting 51 to a raw water supply port 56. As best seen in Figs. 9 and 10, a backwashing port 57 at flat surface 52 of the main casting 51 of the softening control valve is open to a passageway 58 from said backwashing port to the bottom softener tank port 55 and pipe 45. A plug valve 59 is threadably mounted in an extension of said backwashing port 57 to be adapted to come into closing relationship with the passage 58. The extent of flow through the backwashing port 57 can be controlled by the positioning of the plug valve to cover any desired area of the opening of the passageway 58 to the backwashing port.

A central vertical opening 60 extends through the main casting 51 of the softening control valve 32. An elongated cylindrical collar 61 is integral with and extends upwardly from said main casting 51 to be concentric with and to provide a continuation of said vertical opening 60. A valve stem 62 is slidably mounted in said vertical opening 60 as at 63 and 64. A first seal ring 65 is situated in an upper portion of the vertical opening 60 in said casting 51, a second seal ring 66 is situated in an intermediate portion of said opening, and a third seal ring 67 is situated in a lower portion thereof. An upper piston valve 68 is integral with said valve stem 62 and is adapted to be slidable in sealing relationship to said first seal ring 65 and slidable into and out of sealing relationship with said second seal ring 66. A perforated spacer 69 is situated between said first and second seal rings and a soft water outlet port 70 is open to said vertical opening 60 at position between said first and second seal rings and to said soft water outlet pipe 46. A lower piston valve 71 is integral with said valve stem 62 and is adapted to come into sliding sealing relationship with said third seal ring 67 when said upper piston valve 68 is spaced from second seal ring 66 and to be spaced from said third seal ring 67 when said upper piston valve is in sealing relation to said second seal ring 66. A central port 72 opens from the flat surface 52 of the main casting 51 to the vertical opening 60 of said casting at position between said second and third seal rings.

A thrust collar 73 is on said valve stem inside of said elongated cylindrical collar 61. A spiral spring 74 acting on said thrust collar and the top of the main casting 51 serves to normally position the valve stem and the piston valves 68 and 71 so that there is a free passageway from the central port 72 into the vertical opening 60, through the second seal ring 66 and out the soft water outlet port 70 and the soft water outlet pipe 46; and so that there is no passageway from said central port past said third seal ring 67 to drain.

Figure 2:
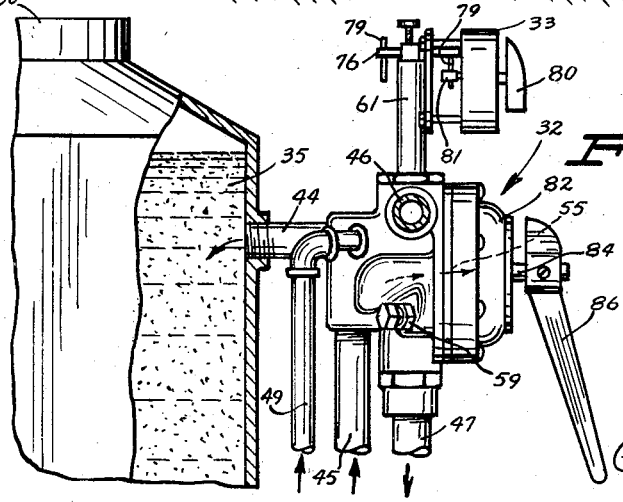
Fig. 2 is an enlarged vertical sectional view of a portion of the apparatus taken on line 2—2 in Fig. 1 showing the flow pattern which obtains when the apparatus is performing the regenerating operation.

The upper end of the valve stem 62 is provided with external threads 75 and a cylindrical pin 76 is rotatably mounted in an upper end of the cylindrical collar 61 to have its axis spaced slightly outwardly from the periphery of the threads 75 of the valve stem 62. A portion of the pin 76 in adjacent relationship to said threads 75 is cut away to form a latch 78. A pair of fingers 79 extend outwardly from opposite ends of said pin 76 as best seen in Fig. 2. As will later be explained, it is necessary that during the regeneration cycle, the valve stem 62 be held in its downward position to close off the soft water outlet port 70 and the soft water outlet pipe 46 and to provide an opening from the central port 72 to the drain pipe 47. To accomplish this, the valve stem and the piston valves are depressed to the position as indicated in dotted lines in Fig. 4. The fingers 79 are weighted to cause the latch 78 of the cylindrical pin 76 to be normally positioned as seen in Fig. 6. An indicating hand 80 of the timer 33 will be set to indicate the time interval which is to elapse before the valve stem is to return to its normal position. When this time period has elapsed, a hammer 81 of the timer will strike one of the fingers 79 to cause the latch 78 to become disengaged from the threads 75. The spring 74 will then cause the valve stem and the piston valves to move to their normal positions.

A softener control valve cap 82 is fixedly mounted on the main casting 51 of the softener control valve to be in sealing relation to the flat smooth surface 52 thereof. A cam 83 extends inwardly from the cap 82. A crankshaft 84 is pivotally mounted in said softener control valve cap 82 at 85, a handle 86 is fixedly mounted on an outer end of said crankshaft, and a rotatable disc valve 87 is fixedly mounted on an intermediate portion thereof. A plate 88 fixedly positioned on the valve stem 62 and is in alinement with the central port 72 of the main casting 51. A crank arm is integral with an offset from the crankshaft 84 and extends through said central port to position above said plate 88. When the handle 86 is rotated through a complete circle, the crank arm 89 will cause the plate 88 to be depressed against the action of the spiral spring 74. As previously explained, the latch 78 will become engaged against the thread 75 to hold the valve stem in its downward position.

The rotatable disc valve 87 has a smooth, flat surface 90 designed to slide in sealing relationship to portions of the smooth, flat surface 52 of the main casting 51. The disc valve 87 is provided with a disc port 91, a second disc port 92, and a third central disc port 93 all open at the smooth flat surface 90 and all connected together by means of a tunnel 94 integral with said disc valve. A fourth disc port 95 is open from the flat surface 90 through the disc valve 87. A depression 96 surrounds around the fourth disc port 95 and a keeper finger 97 extends outwardly from the disc valve in close proximity to the depression 96. An upstanding annular ridge 98 extends part way around the periphery the disc valve and a positioning pin 99 extends outwardly therefrom. A disc regeneration port 100 extends through the disc valve 87 as does a disc backwashing port 101 and a disc downwashing port 102.

A steel ball 103 is designed to ride between the tunnel 94 and the upstanding annular ridge 98 and between the keeper finger 97 and the positioning finger 99. With the parts positioned in Fig. 11, the ball will be positioned as seen in that figure. This is the normal softening operating position. Should the handle 86 and consequently the crankshaft 84 and the disc valve 87 be rotated in a clockwise direction as seen in Fig. 11, an edge 104 of the cam 83 will prevent the ball from rotating with the disc valve 87. When the ball becomes aligned with the depression 96, however, it will be moved therein under the action of the edge 104 of the cam 83 and the keeper finger 97 will cause the ball to be rotated around with the disc valve and with an outer surface 105 of the cam 83 holding the ball in said depression. When the ball reaches an edge 106 of the cam, the cam is no longer effective in holding the ball in position.

A float 107 is fixedly attached to a float rod 108 which, in turn, is slidably mounted with respect to a float tank 40 as at 109. The regeneration control valve 34 includes a base casting 110, a diaphragm 111, and an upper casting 112. A chamber 113 constituted as hollowed portions of both the upper and base castings is normally divided by the diaphragm 111 as best seen in Fig. 21. Upper diaphragm plate 114 and lower diaphragm plate 115 are held in contact with the upper and lower surfaces of the diaphragm respectively by a valve supporting rod 116 and a plunger 117 which is threadably mounted on said rod. The base casting 110 is provided with an inwardly extending ring 118. This ring is provided with an upper valve seat 119 and a lower valve seat 120. An upper valve wafer 121 is attached to the lower diaphragm plate 115 and a spacer 122 positions a lower valve wafer 123 on the valve supporting rod 116 in spaced relationship to said upper wafer. A spherical check valve 124 normally rests against a check valve seat 125 situated in the brine pipe 50 and a by-pass opening 126 extends past said valve seat.

A rectilinear notch 127 is provided in one side of the plunger 117 and a cylindrical pin 128 is rotatably mounted in said upper casting 112 to have its axis spaced slightly outwardly from the edge of said plunger at a side thereof adjacent said notch. A portion of said cylindrical pin 128 adjacent the plunger 127 is cut away to form a flat surface 129 having an upper latch 130 and a lower latch 131 each constituted as the intersection of the upper and lower edges of the flat surface 129 with the cylindrical surface of the pin 128, respectively. A control lever 132 is integral with and extends perpendicularly outwardly from said cylindrical pin 128. An outer end of said control lever is provided with an opening 133 therethrough, through which the float rod 108 passes. An upper collar 134 is fixedly positioned on the float rod above said control lever 132 and a lower collar 135 is fixedly positioned on said rod below said control lever.

A compression spiral spring 136 is maintained in operational relationship with a top end of the plunger 117 by the bar 137. An opening 138 is provided in the upper casting 112 to permit atmospheric pressure to be brought to bear on the upper surface of the diaphragm 111.

The base casting 110 is provided with an injector 139. Regenerating raw water supply pipe 48 opens to a nozzle compartment 140 of said injector 139. A nozzle 141 adjacent the nozzle compartment, is open to the chamber 113 at position below the diaphragm 111 and this nozzle discharges into venturi 142 of the injector which in turn is open to regenerating delivery pipe 49. A needle valve 143 is threadably mounted in an end of the nozzle compartment 140 and extends from the outside thereof to the opening of the nozzle 141. As can be clearly seen in Fig. 119, the positioning of the needle valve in the nozzle will regulate the flow at said nozzle and this determines the reduction of pressure inside of the lower part of the chamber 113.

A dust cap 144 protects the top of the regeneration control valve 34.

OPERATION

Normal softening operation

In its normal softening operation, the water flow in the system is through the raw water inlet pipe 43, the softening control valve 32, and into the top of the softener tank 30 by way of the top softener tank pipe 44. The water passes down through the zeolite bed 35 in said tank and in so doing is softened as the calcium and magnesium salts therein are converted to soluble sodium salts. The water leaves the bed 35 and the bottom of the tank 30 through the bottom softener tank pipe 45, and passes through the softening control valve 32 to the soft water outlet pipe 46.

During normal softening operation, handle 86 of the softener control valve 32 will be in its downward position as indicated in Figs. 1 and 12 and as indicated in dotted lines in Fig. 11, and valve stem 62 and its associated parts will be positioned as seen in full lines in Fig. 4. The rotatable disc valve 87 and the ball 103 will be positioned as seen in Fig. 11. This positioning of parts establishes an opening from raw water inlet pipe 43 through raw water inlet port 53 to the interior of the softener control valve cap 82. From here the water passes through the fourth disc port 95 in said rotatable disc valve 87, top softener tank port 54, through top softener tank pipe 44, through the zeolite bed 35 inside of water softener tank 30, out bottom softener tank pipe 45, through said bottom softener tank port 55 in the main casting 51 of the softening control valve 32, into the second disc port 92 of the rotatable disc valve 87, through tunnel 94 of said disc valve, through central port 72 into the central vertical opening 60, through second seal ring 66 therein, out through the openings in the perforated spacer 69, through soft water outlet port 70, and into soft water outlet pipe 46 to be carried to locations for use (not shown).

Since, with the parts in this position, the disc regeneration port 100 is in alinement with the raw water supply port 56, and, consequently, the raw water supply pressure is open to the regenerating raw water supply pipe 48; and since as best seen in Fig. 5, top softener tank pipe 44 is open to regenerating delivery pipe 49 at top softening tank port 54, and, consequently, the full water pressure less any friction losses going through the apparatus is available in regenerating delivery pipe 49; there is sufficient pressure in chamber 113 of the regeneration control valve 32 to cause the diaphragm 111 to move to its upper position.

During this normal softening operation, the brine tank 31 will contain sufficient water therein so that the bottom of the salt 38 will be immersed thereby. This will insure that at the end of the normal operating period and when it is time for regenerating, sufficient salt will have dissolved to form a brine of maximum concentration. This water in the brine tank will cause the float 107, the float rod 108 and the lower collar 135 thereon to be positioned as seen in Fig. 1 and the control rod 132 will, therefore, be held in its uppermost position as seen in Figs. 1 and 18. This will cause the lower latch 131 to be in spaced relationship to the plunger 117. Since the full pressure of the water system is present in both the regenerating raw water supply pipe 48 and regenerating delivery pipe 49, and since there is nothng tending to hold the diaphragm from movement to an upward position except the relatively weak compression spiral spring 136, the diaphragm will take position as seen in Fig. 18 and Fig. 20 and the lower valve wafer 123 will be in sealing relation to the lower valve seat 120 to prevent passage of water through the annular ring 118.

*Backwashing operation*

After the water softener has run through several cycles of regeneration and softening operation, it is desirable that the zeolite bed 35 be backwashed to remove any solid impurities such as sludge or other sediment which may have been trapped due to the filtering action of the bed. In order to do this, the timer is set to indicate some time, say fifty-five (55) minutes and the control handle 86 of the softening control valve 32 is rotated in clockwise direction through one half of a circle from position as seen in Figs. 1 and 12 to position as seen in Fig. 14 and as seen in dotted lines in Fig. 13. The position of the disc valve 87 will then be as illustrated in Fig. 13 and the flow of water in the pipes will be as illustrated in Figs. 13 and 14.

As the handle 86 is rotated in clockwise direction from the positon as seen in Fig. 12 to that as seen in Fig. 14, the action of the ball 103 must be considered. At the beginning of this movement, the ball is resting, under the influence of gravity, at the bottom of the disc valve against positioning pin 99. As the disc 87 begins to rotate in a clockwise direction, gravity will maintain the ball 103 at the bottom thereof. That is, the ball will roll on the annular ridge 98 as the ridge moves underneath the ball from right to left in Fig. 11. In order to insure positive action, however, the cam 83 has been provided. When positioned as seen in Fig. 11, the ball will also be resting against or near the edge 104 of said cam. Even if the ball were to stick to the disc valve, the cam edge 104 would prevent its rotation with said disc valve. As the disc is rotated farther around, the ball will come into alinement with the depression 96 and keeper finger 97 will impinge on a portion of the ball to tend to force it into said depression and to cause it to begin to rotate with the disc. Cam edge 104 cooperates with this action and the ball takes its place in the depression in sealing relationship to the fourth disc port 95. This takes place after approximately ninety (90) degrees of rotation and the rotation is continued for the remaining ninety (90) degrees until the parts are positioned in Fig. 13. During this later rotation, the ball will be held in place in the depression 96 and in closing relationship to the fourth disc port 95 by the outer surface 105 of the cam 83. As now positioned, the crank arm 89 has depressed the plate 88 and the valve stem to position as seen in dotted lines in Fig. 4. This causes the lower piston valve to be spaced from the third seal ring to connect the central vertical opening in the casting 52 to drain; and causes the upper piston valve 67 to move into sealing relation with the second seal ring 66 to seal the central port 72 from the raw water supply port 56 and the soft water outlet pipe 46.

With the disc valve positioned as seen in Fig. 13 and the valve stem and valve pistons positioned as just explained, the pipes 48 and 49 are both sealed off at the softening control valve and there is no tendency toward flow in the regeneration control valve 34 and the brine pipe 50.

As is always the case, the raw water from the inlet pipe 43 has access to the inside of the softener control valve cap 82. The ball 103 is in sealing relationship to the fourth disc port 95 which is in alinement with the bottom softener port 55 so there can be no flow therethrough. The other ports open to the flat surface 52 are covered by the disc valve with the exception of the backwashing port 57 of the casting 51 which is in alinement with the disc backwashing port 101. Flow is possible through these ports and the passageway 58 to the bottom softener tank pipe 45. This flow is past the plug valve 59 which can be set to cover any desired area of said passageway. This regulation is desirable since an unrestricted backwashing action would carry some of the zeolite in the bed 35 out to drain. At the same time, however, the greater the backwash flow without carrying over some of the zeolite to drain, the better is the cleaning job done inside of the softener tank. While this plug valve can be set on the job to give the maximum flow consistent with not losing any zeolite, it is more usual for this adjustment to be made at the factory after the pressure of the water supply system with which the softening system is to be used is determined. This backwashing flow will enter the softening tank at the bottom thereof and will wash the zeolite as it proceeds to the top of the tank where it will leave by the top softener tank pipe 44. This pipe 44 opens to top softener tank port 54 which is, as seen in Fig. 13, in alinement with the second disc port 92. Backwashing flow will be through these ports, into the tunnel 94 and through the third central port 93 and the central opening 60 to drain. This flow can be allowed to continue as long as necessary, but is usually allowed to continue until the water passing to drain runs clear. This might take place after five or ten minutes.

*Downwashing operation*

After the backwashing operation has been completed or even if there is to be no backwashing operation, it is often desirable to wash the zeolite bed down with water from the supply system running through the bed from top to bottom and then to drain. This will serve to remove impurities from the zeolite bed and other parts of the system. This may be accomplished by moving the handle 86 from the position as seen in Fig. 14 or the position as seen in Fig. 12 in a clockwise direction for one quarter of a turn to the position as seen in Fig. 16. When this is done, the rotatable disc valve 87 will be positioned as seen in Fig. 15. The valve stem 62 and the piston valves 68 and 71 will remain in the positions as illustrated in Fig. 4 in full lines and as described in connection with the backwashing operation. This is so because the latch 78 will be in contact with the threads 75 to prevent the spring 74 from moving said valve stem and piston valves to the normal softening positioning thereof. Soft water outlet pipe 46 and consequently regenerating delivery pipe 49 as well as raw water supply port 56 and consequently regenerating raw water supply pipe 48 are closed off by the flat surface 90 of the disc valve 87 and therefore there is no tendency toward flow in the regeneration control valve 34 or in brine pipe 50.

Raw water entering the cap 82 has access through disc downwashing port 102 to top softener tank port 54. The downwashing flow will then be through this port, the top softener tank pipe 44, down through the zeolite bed 35 and the water softener tank 30, out bottom softener tank pipe 45 and bottom softener tank port 55 to tunnel 94 and central port 72 and through central vertical opening 60 to drain.

It is to be noted that the ball 103 is still held in depression 96 by the outer surface 105 of the cam 83.

The downwashing flow can be allowed to continue as long as necessary but is usually allowed to continue until the water passing to drain runs clear. This might take a minute or two.

Regenerating operation

In order to begin the regenerating operation, the handle 86 is moved in clockwise direction from position as seen in Fig. 14 or in Fig. 16 to position as seen in Fig. 2. If, as is often the case, the regenerating operation is to be accomplished at the end of a normal softening operation without performing the backwashing or downwashing operation, the handle 86 is moved from position as seen in Fig. 2 or Fig. 11 in a clockwise direction until the handle is again in the same position. This is done in either of these cases after the timer 33 is set or reset to a proper regenerating time interval. This may be on the order of fifty-five (55) minutes, for example. With the timer so set, the action of the crank arm 89 on the plate 88 is to cause the plate, the valve stem 62, upper piston valve 68 and lower piston valve 71 to be moved to their lowest position when the handle reaches position as seen in Fig. 14. At this time, the latch 78 will engage the external threads 75 on the valve stem 62 and will prevent this stem from returning to its normal upward position. As previously explained, this seals the soft water outlet pipe 46 from the central vertical opening 60 in the casting 51 and opens the drain pipe 47 to said central vertical opening. This provides an opening to drain from the bottom of the softening tank 30, through bottom softener tank pipe 45 and bottom softener tank port 55, the second disc port 92 and the tunnel 94 to the third central disc port 93 and the central port 72 which is open to central vertical opening 60. This means that there is little pressure inside of the softener tank 30 and since the full pressure is available against the ball 103, this pressure holds said ball in position as seen in Fig. 17 on fourth disc port 95 as it is alined with top softener tank port 54 which opens through top softener tank pipe 44 to the top of said softener tank 30. This ball is held in position even though it is now clear of the edge 106 of the cam 83 and is no longer held in the depression 96 by the outer surface 105 of said cam. As best seen in Fig. 17, this regeneration port is in alinement with raw water supply port 56 and this allows a flow of raw water into regenerating raw water supply pipe 48, through nozzle compartment 140 and nozzle 141 into venturi 142 and regenerating delivery pipe 49. Since this pipe 49 is open to top softener tank pipe 44 and the top of the softener tank 30, the flow is downward from this point through the zeolite bed, out the bottom of the tank and to drain. Flow through the nozzle and venturi causes a reduction in pressure in the chamber 113 on the lower side of the diaphragm 111 and this reduction in pressure allows atmospheric pressure acting thereon to move the diaphragm 111 in a downward direction until the upper latch 130 of the cylindrical pin 128 comes in contact with a top edge of the rectilinear notch 127 in the plunger 117. The positioning of parts at this point is illustrated in Fig. 21. Both the upper and lower valve wafers are spaced from the upper and lower valve seats at this time so brine in the brine tank 31 and in the float tank 40 will be drawn past the spherical check valve 124, through the inwardly extending annular ring 118, and will be drawn into the venturi 142 from the chamber 113. As will be seen, the nozzle 141 and the needle valve 143 restrict the flow and consequently the pressure in the pipe 49. The needle valve can be adjusted to exactly regulate the flow without sacrificing any of the velocity at the nozzle and venturi as would be the case if the flow were regulated at some other point along the regenerating raw water supply pipe or the regenerating delivery pipe. This pressure in the regenerating delivery pipe 49 is always low enough so that the differential between it and the pressure tending to hold the ball 103 in position will be sufficient to so maintain the ball.

Figure 22:
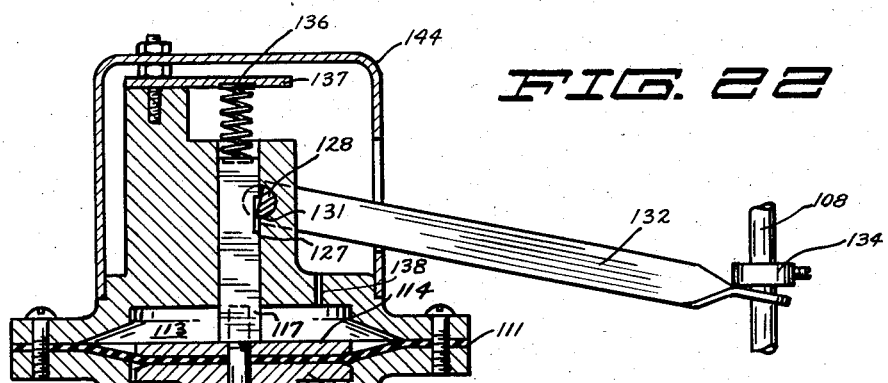
Fig. 22 is a view corresponding generally with the disclosure of Fig. 18, but showing the parts positioned as for brine rinsing portion of the regeneration operation.

The brine water mixture leaving the venturi and flowing into the top of the softener tank 30 and down through the zeolite bed will cause the bed to be regenerated and this mixture will continue to flow until the brine in the brine tank and the float tank reach a level such that the float 107 and the float rod 108 bring the upper collar 134 into contact with the outer end of control rod 132 of the regeneration valve to cause said rod to move in a downward direction. When this happens, the upper latch 127 will become spaced from the plunger 117 and the reduced pressure inside of the chamber 113 will allow the diaphragm to continue downward to position as seen in Fig. 22. In this position, the upper valve wafer 121 is seated against upper valve seat 119 and no further brine will be drawn up the brine pipe 50. This positioning of the parts and also the flow of raw water through the nozzle and venturi will continue until the end of the period for which the timer is set. Since the brine tank is no longer delivering brine to the regeneration control valve 32, the brining portion of the regenerating operation is completed and the clear raw water flowing through the tank rinses all traces of the brine from the tank. This is known as the brine rinsing portion of the regenerating operation.

Figure 23:
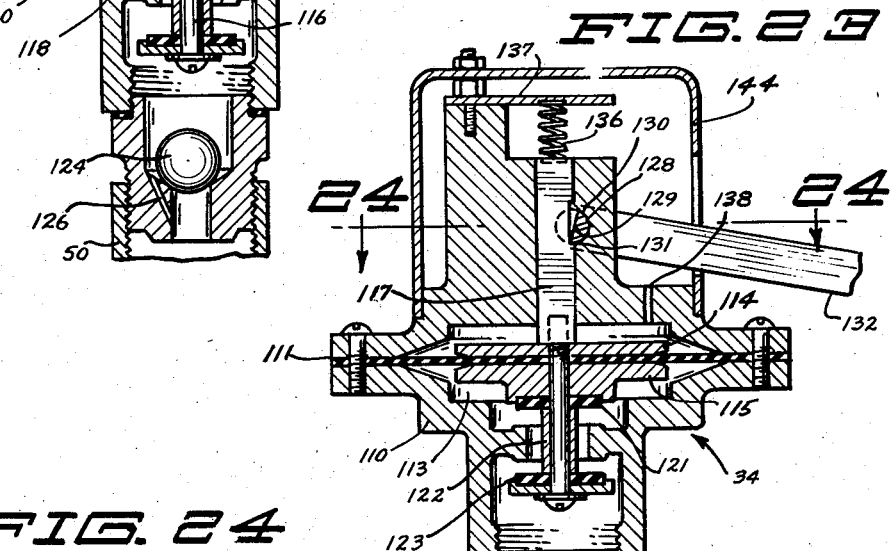
Fig. 23 is a view corresponding generally with the disclosure of Fig. 18, but with the parts positioned as for the tank refilling period.
Figure 24:
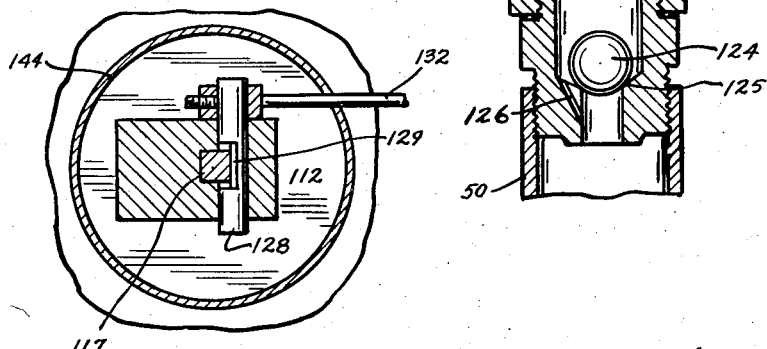
Fig. 24 is a horizontal sectional view taken on line 24—24 in Fig. 23.

At the end of the period for which the timer is set, the hammer 81 thereof will strike one of the fingers 79 to cause the latch 78 to be moved into position spaced from the valve stem 62 and the threads 75 thereof. The spring 74 will then move the valve stem to its upper position. In this position, as previously explained, the central vertical opening 60 is open through the spacer 69 and the soft water outlet port 70 to soft water outlet 46 and the locations for use of the softened water. During the regenerating cycle, the outlets (not shown) to which the soft water outlet pipe leads are closed. Upon the operation of the valve stem and the piston valves to open the soft water outlet pipe 46 to the central opening 60 and to close this opening from the drain pipe 47, the raw water passing through the nozzle and venturi and into the top of the tank through the regenerating delivery pipe will cause a pressure to be built up against the closed off soft water outlet pipe 46. When this pressure builds up sufficiently, it will equalize with the pressure on both sides of the ball 103, and, under the action of gravity, the ball will fall from position as seen in Fig. 17 to position as seen in Fig. 11. This uncovers the top softener tank port 54 and the full raw water supply is again available through this port to the top of the softener tank 30. As this pressure backs up in the pipes 49 and 48, it will likewise build up in chamber 113. This will cause the diaphragm 111 to tend to move in an upward direction and it will do so until the lower latch 131 of the cylindrical pin 128 engages a bottom edge of the rectilinear notch 127. This positioning of the parts is illustrated in Fig. 23. As will be seen in that figure, the upper and lower valve wafers are again spaced from the upper and lower valve seats, respectively, of the annular ring 118 and the full supply pressure in pipes 48 and 49 is available through this annular ring. There will be a flow, therefore, through by-pass opening 126, down the brine pipe 50 and into the float tank and brine tank. This flow will continue until the float 107 and float rod 108 again assume positions as seen in Fig. 1 and cause the control rod 132 of regeneration control valve 34 to move in an upward direction to cause the lower latch to again be spaced from the plunger 117. The pressure in chamber 113 will then cause the diaphragm to move in an upward direction until the lower valve wafer 123 is again in sealing relationship to the lower valve seat 120 and the flow down into the brine tank is thereby terminated.

The parts are now positioned as originally described and when the ball 103 fell to position as seen in Fig. 11, the softener went into normal softening operation.

Compression coil spring 136 has no part in the usual operation of the system and is present merely to insure that the lower latch 131 is in the notch 127 when the control rod 132 is in its downward position and the apparatus is first put into operation. This is so that when pressure is first introduced into chamber 113, the diaphragm cannot move to its uppermost position to allow the lower valve wafer to come into contact with the lower valve seat 120 to prematurely shut off the flow of water to the brine tank.

What is claimed is:

In a water softening system, including a water softener tank containing a bed of softening medium, a top softener tank pipe open at a first end thereof to said medium in the top of said tank, a bottom softener tank pipe open at a first end thereof to the medium in the bottom of said tank, a soft water outlet pipe adapted to be connected to said bottom softener tank pipe, and a raw water inlet pipe adapted to be connected to said top softener tank pipe, the combination of a water softening control valve having a main casting, a water softening control valve cap, said cap being in sealing relation to said casting to provide a pressure chamber between said cap and said casting, said casting being provided with a smooth, flat plane surface in said pressure chamber, said pressure chamber being open to said raw water inlet pipe, said plane surface of the main casting being provided with a top softener tank port open to a second end of said top softener tank pipe, a bottom softener tank port open to a second end of said bottom softener tank pipe, a raw water supply port, a back washing port and a central port, said main casting being provided with a central opening open to said central port, a soft water outlet port open to said central opening and said soft water outlet pipe, said central opening being open to drain, first valve means including a valve stem slidably mounted in said central opening, a first seal ring between said soft water outlet port and said central port in said central opening, a first piston valve mounted on said valve stem, a second seal ring between said central port and drain in said central opening and a second piston valve mounted on said valve stem, and second valve means including a rotatable disc valve provided with a plane disc surface positioned in contiguous, sealing relationship to said plane surface of said main casting, said disc valve having a tunnel provided therein, a first disc port open to said plane disc surface and said tunnel, a second disc port open to said plane disc surface and to said tunnel, a central third disc port open between said central port of said main casting and said tunnel, a fourth disc port open between said plane disc surface and said pressure chamber, a disc back washing port open to said plane disc surface and said pressure chamber, a disc regeneration port open to said plane disc surface and said pressure chamber and a down washing port open to said plane disc surface and said pressure chamber; said first valve means being movable between a first position wherein said first piston valve is in sealing relation to said first seal ring and said second piston valve is in clearing relation to said second seal ring and a second position wherein said first piston valve is in clearing relation to said first seal ring and said second piston valve is in sealing relation to said second seal ring; said second valve means being movable between a first position wherein said disc backwashing port is in alinement with said backwashing port of said main casting, said first disc port is in alinement with said top softener tank port, said fourth disc port is in alinement with said bottom softener tank port, and said plane disc surface is in sealing relation to said raw water supply port, a second position wherein said top softener tank port is in alinement with said disc downwashing port, said second disc port is in alinement with said bottom softener tank port and said plane disc surface is in sealing relation to said backwashing port and said raw water supply port, and a third position wherein said disc regeneration port is in alinement with said raw water supply port, said fourth disc port is in alinement with said top softener tank port, said plane disc surface is in sealing relationship to said back washing port and said first disc port is in alinement with said bottom softener tank port; third valve means including a valve operative in response to movement of said second valve means from its second to its third position and in response to a positive pressure differential in said pressure chamber with respect to said softener tank to close said fourth disc port, said valve of said third valve means being operative in response to equalization of pressure in said softener tank and pressure chamber to move to clearing relation to said fourth disc port, and to close said fourth disc port in response to movement of said second valve means to its first position; a regenerating raw water supply pipe having a first end thereof open to said first raw water supply port; a regenerating delivery pipe having a first end thereof open to said top softener tank port; a brine tank having a perforated screen for carrying salt thereon situated at an intermediate portion thereof; a regeneration control assembly including a base casting having a diaphragm chamber and a brine chamber provided therein, a nozzle compartment open to a second end of said regenerating raw water supply pipe, a nozzle adapted to discharge from said nozzle compartment into said diaphragm chamber, a venturi in operational alinement with said nozzle and open to a second end of said regenerating delivery pipe, a brine pipe open from the bottom of said brine tank to said brine chamber, and a brine valve in said brine pipe; means responsive to reduction of pressure in said diaphragm chamber to open said brine valve, means responsive to subsequent flow of brine from said brine tank to close said brine valve, means responsive to subsequent increase in pressure in said diaphragm chamber to open said brine valve, and means responsive to subsequent flow of water into said brine tank to close said brine valve.

References Cited in the file of this patent
UNITED STATES PATENTS

| | | |
|---|---|---|
| 2,078,361 | Zimmerman | Apr. 27, 1937 |
| 2,243,815 | Griswold | May 27, 1941 |
| 2,352,630 | Griswold | July 4, 1944 |
| 2,532,614 | Evans | Dec. 5, 1950 |
| 2,539,221 | Badeaun | Jan. 23, 1951 |
| 2,539,748 | Mueller | Jan. 30, 1951 |
| 2,556,872 | Deters | June 12, 1951 |
| 2,571,000 | Albertson | Oct. 9, 1951 |